United States Patent [19]
Barrows et al.

[11] Patent Number: 5,191,919
[45] Date of Patent: Mar. 9, 1993

[54] CLOSED TRANSFER MEANS

[75] Inventors: Peter S. Barrows, Yardley, Pa.; Clyde D. Watson, San Jose, Calif.

[73] Assignee: FMC Corporation, Chicago, Ill.

[21] Appl. No.: 779,217

[22] Filed: Oct. 18, 1991

[51] Int. Cl.$^5$ ............................................. B65B 1/04
[52] U.S. Cl. ................................. 141/2; 141/85; 141/105; 141/387; 137/560; 137/567; 137/597
[58] Field of Search ............... 141/18, 21, 100, 105, 141/89, 85, 91, 387; 222/333; 137/560, 567, 571, 595, 597

[56] References Cited

U.S. PATENT DOCUMENTS

| | | |
|---|---|---|
| 3,326,232 | 6/1967 | Stamps et al. |
| 4,171,710 | 10/1979 | Boynton et al. ............... 141/104 X |
| 4,195,672 | 4/1980 | Freeman ............................... 141/91 |
| 4,842,016 | 6/1989 | McKenzie ........................... 137/597 |
| 4,872,491 | 10/1989 | Nickason et al. ................ 141/105 X |

*Primary Examiner*—Allan N. Shoap
*Assistant Examiner*—Jes F. Pascua
*Attorney, Agent, or Firm*—Ronald C. Kamp; R. B. Megley

[57] ABSTRACT

A closed transfer apparatus for transferring liquid from a container to a dilution tank in measured volume includes an actuator moveable to a first position that energizes an electric pump to pump liquid from the container into a transfer tank and moveable to a second position which energizes the pump to pump liquid from the transfer tank to the dilution tank; the actuator being biased to a center position in which the electric pump is de-energized and the tanks and the container are all isolated.

4 Claims, 2 Drawing Sheets

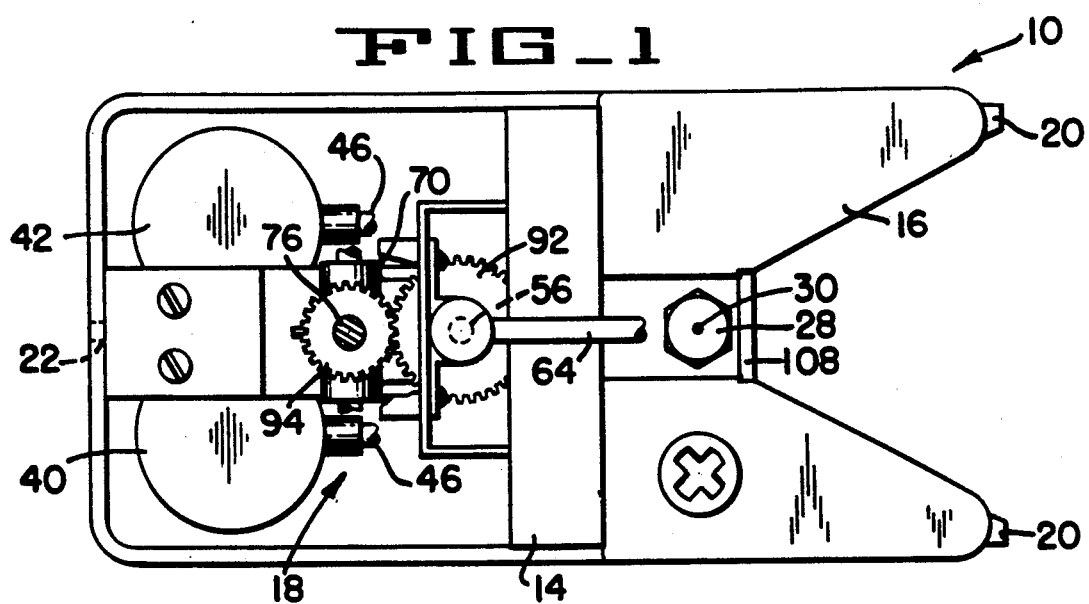
FIG_1
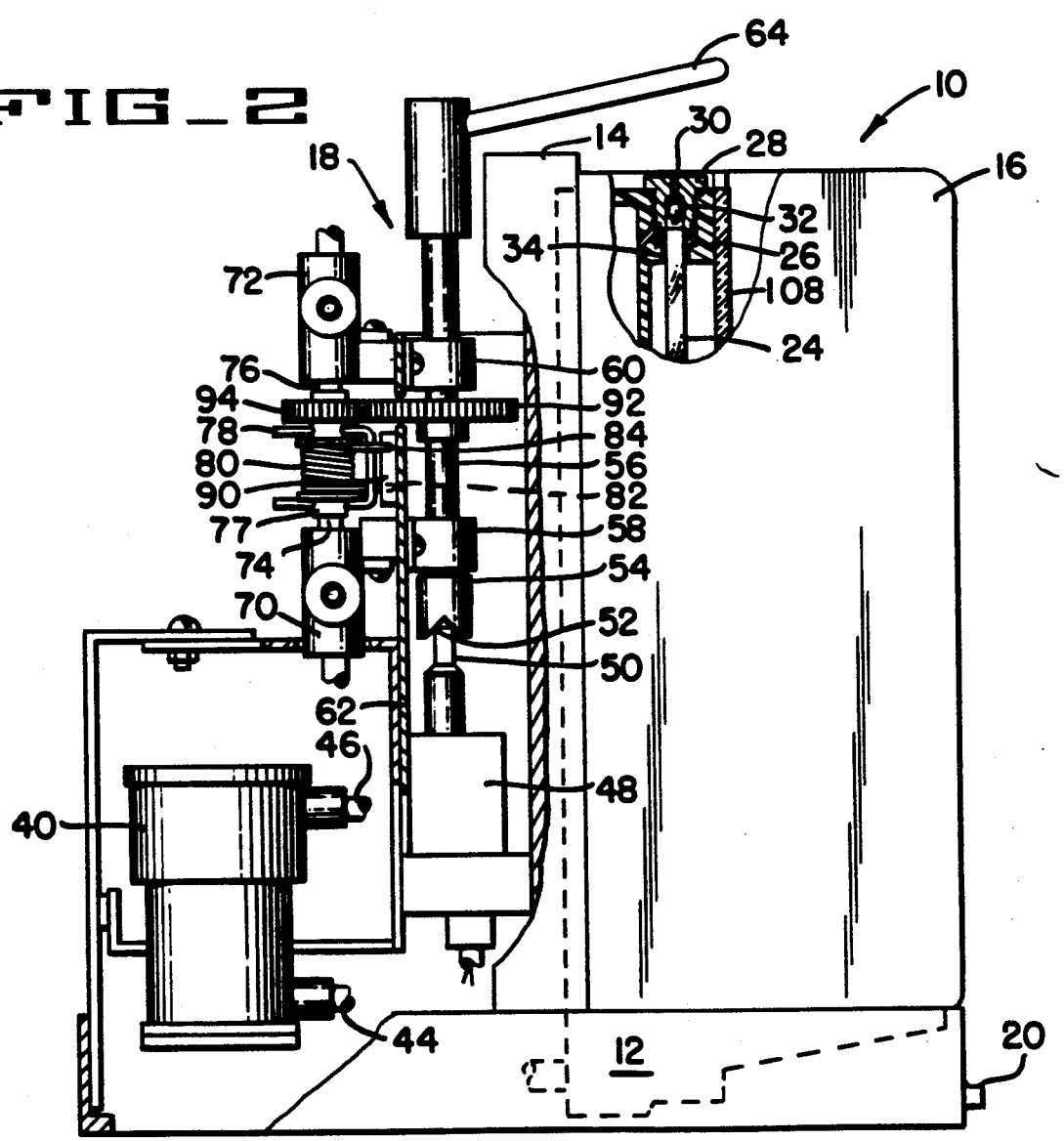
FIG_2

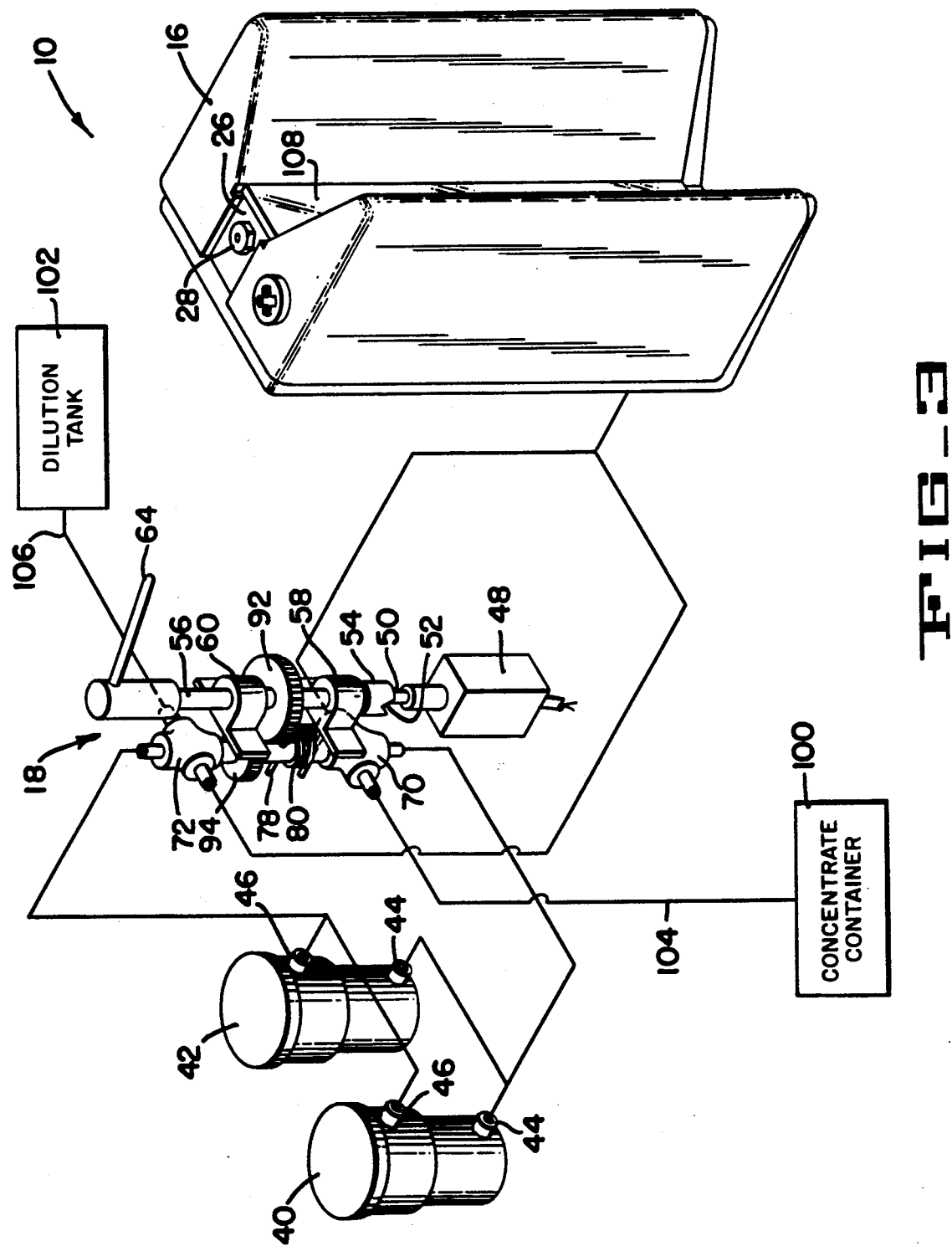

CLOSED TRANSFER MEANS

This invention relates generally to a means for the closed transfer of a liquid concentrate from a small container to a large tank, and more particularly, to such a means which is capable of measuring the volume of liquid introduced to the tank for proper dilution of the concentrate.

The handling of chemicals, such as pesticides and fungicides, for example, requires care and precision in order to safeguard the health of the workers, as well as the environment. In order to apply such chemicals, such as to eradicate termites or to protect row crops or groves of trees, for example, it is typical to dilute a concentrate of the chemical, which is supplied in a returnable sealed container, with water in a large tank on a sprayer. The precise ratio of concentrate to water is important so that a safe, yet effective, solution is applied to the area being treated or to the plants. Measuring the volume of chemical is a critical step in the preparation of the proper solution because the chemical represents a much smaller volume than that of the water, so a small variation in the chemical volume has a disproportionately greater effect on the resulting solution than a small variation in the volume of water. Since the solution is prepared in the field, the measurement of the chemical volume must be accomplished reliably and accurately under a wide range of conditions. The transfer must also be accomplished with the least likelihood of spillage, including that due to human error, and with minimum exposure to the workers and to the environment.

The present invention provides a closed transfer means which permits safe and accurate transfer of liquid from a chemical container to a dilution tank, which is simple and safe to operate, which is reliable and fail safe, and which will operate consistently under a wide variety of conditions, including physical orientation. These and other attributes of the present invention, and many of the attendant advantages thereof, will become more readily apparent from a perusal of the following description and the accompanying drawings, wherein:

FIG. 1 is a top plan view of a closed transfer means according to the present invention;

FIG. 2 is a side elevational view, with portions broken away, of the transfer means shown in FIG. 1; and FIG. 3 is an expanded pictorial view of the transfer means shown in FIGS. 1 and 2 showing its connection with a container and a dilution tank.

Referring now to FIGS. 1 and 2, there is shown a closed transfer means, indicated generally at 10, which includes a base frame 12 with an upright support plate 14 attached thereto. A transfer tank 16 is supported on the frame 12 and is secured therein by a hold-down bracket (not shown) attached to the top of the plate 14. A pump and control means 18 is secured to the plate 14 on the side opposite the tank 16. The frame 12 has projecting tabs 20 for engagement with complementary slots in a carrier (not shown) capable of being mounted in a pick-up truck or other vehicle. A bolt or pin extends through a hole 22 in the frame 12 and a complementary hole in the carrier to permit ready replacement by securing the frame 12, and thus the entire means 10 in the carrier and therefore the truck.

Since the surface on which the truck is resting may not be perfectly horizontal, the transfer tank 16 should be capable of accurately measuring the volume of liquid therein regardless of the angle at which it may be canted from vertical. To achieve this, the sight glass 24 (see FIG. 2) is positioned on the exterior of the tank, but with the longitudinal centerline of the sight glass being on the centroid of the plan form area of the tank 16. In this position the sight glass will provide a consistently accurate indication of the liquid volume in the tank regardless of the orientation of the tank. The upper end of the sight glass 24, which is merely a clear glass hollow tube, slideably extends through a hole in a boss 26 formed on the tank 16. Packing surrounds the tube 24 which is compressed by the end of a fitting 28 threaded into a tapped opening in the boss 26. This seals the upper end of the tube 24 while permitting relative movement between the tube and the tank to compensate for the difference in thermal expansion. A vent hole 30 in the fitting 28 permits gases to escape from or enter the tank 16, while a floating ball 32 carried in a counterbore prevents escape of liquid, as would otherwise occur as a result of bouncing during transport, an extreme angle from vertical of orientation or when overfilling of the tank 10 is attempted. A bore 34 and a cross bore in the fitting 28 permits fluid communication between the top of the sight glass and the tank interior. The lower end of the tube 24 is sealingly mounted in a boss similar to boss 26, and having a fitting similar to fitting 28 but without a vent 30 and a ball 32 with a bore similar to bore 34 providing fluid communication between the tank interior and the lower end of the tube 24. The pumping and control unit 18 includes a pair of electrically driven pumps 40 and 42 having inlets 44 and outlets 46. The pumps are preferably of the type which operate at 12 volts so that power can be obtained from the truck battery and electrical system. An electrical switch 48 having a plunger 50 which is depressed to close contacts and activate the pumps 40 and 42 is contacted by a cam 52. The cam 52 is simply a V-shaped notch, which notch is complementary with the upper end of the plunger 50, extending diametrically across a collar 54 secured to the end of a shaft 56 rotatably mounted in aligned bushings 58 and 60 supported on bracket 62 secured to the plate 14. An actuating handle or lever 64 is secured to the upper end of the shaft 56 so that rotation of the shaft 56 by the lever 64 will cause the cam 52 to push the plunger 50 downward energizing the pumps 40 and 42.

A pair of 4-way valves 70 and 72 are supported on the bracket 62 and have their operating stems 74 and 76 respectively inserted into and aligned with a sleeve 77. The stems 74 and 76 and the sleeve 77 are cross-drilled to accept a stiff U-shaped wire 78 which extends therethrough to couple the stems for rotation in unison. A torsion spring 80 is trapped over the sleeve 77. The spring 80 has extended ends 82 and 84, the lower end 82 extending past one side of the stiff wire 78 and a flange 90 mounted on the bracket 62 and the upper end 84 extending past the other side of the stiff wire 78 and the flange 90. Engaging spur gears 92 and 94 are secured respectively to the shaft 56 and to the collar 77. Movement of the handle 64 to rotate shaft 56 will result in the gears 92 and 94 imparting rotation to the sleeve 77, which rotation will be transferred to the stems 74 and 76. Rotation will also cause the wire 78 to engage one of the extended spring ends 82 or 84 while the other spring end will be restrained by the flange 90. This will cause the torsion spring 80 to "wrap-up", so that upon release of the handle 64, the torsion spring 80 will return the valves 70 and 72 to a center neutral position, in which position all conduit connections to each of the valves 70 and 72 are blocked or dead-ended. The gear 94 has a smaller diameter, and thus fewer teeth, than the gear 92. As a consequence, the valve stems 74 and 76 will rotate a greater amount, i.e., through more degrees of revolution than the handle 64 and the shaft 56, which causes the valves 70 and 72 to be opened before the switch 48 is closed by the engagement of the plunger 50 with the cam 52 and to open the switch 48 turning the pumps off before the valves are closed.

Referring now to FIG. 3, the closed transfer means 10 is shown connected to a returnable, sealed container 100, in which the chemical concentrate is supplied, and to a dilution tank 102, such as would typically be a component part of an agricultural sprayer. To transfer the chemical from the container a conduit 104 is connected between the container to the valve 70, and to effect transfer of a measured volume of that chemical to the dilution tank 102, a conduit 106 is connected between the valve 72 and the tank 102. Initial movement of the handle 64 in one direction will connect the conduit 104 with the inlets 44 of the pumps 40 and 42 through the valve 70 while simultaneously connecting the outlets 46 of the pumps 40 and 42 with the tank 16. Continued movement of the handle in the same direction will cause the cam 50 to depress the plunger 52 a sufficient distance to close the switch 48 and activate the pumps 40 and 42. Once the contents of the container 100 have been transferred to the tank 16, the handle 64 can be moved in the opposite direction which will connect the tank 16 with the inlets 44 to the pumps 40 and 42 through valve 70, while connecting the outlets 46 of the pumps with the tank 102 through the valve 72 and conduit 106. The volume of chemical transferred from tank 16 to the tank 102 can be conveniently and accurately monitored by the operator observing the change in liquid level within the tank 16 as shown in the sight glass 24. A transparent cover 108 with appropriate indicia thereon mounted on the tank 16 provides both protection for the sight glass and means for accurate determination of volume.

While a preferred embodiment of the present invention has been illustrated and described herein, various changes may be made therein without departing from the spirit of the invention as defined by the scope of the appended claims.

What is claimed is:

1. A closed transfer means for transferring liquid from a container to a dilution tank in measured volume comprising:

a transfer tank;

electric pump means having an inlet and an outlet;

valve means connected between said pump means, said tanks and said container;

switch means for activating said pump means;

actuating means movable to first and second positions from a center neutral position in which said pump means, said tanks and said container are isolated from each other;

said actuating means in said first position connecting said inlet to said container and said outlet to said transfer tank, and in said second position connecting said inlet to said transfer tank and said outlet to said dilution tank; and said actuating means including means to close said switch means when in said first and second positions only.

2. The invention according to claim 1, wherein said pump means comprises first and second electric pumps connected in parallel so that liquid transfer may be effected even if one of said pumps fails to operate.

3. The invention according to claim 1, and further comprising centering means to return said valve means to said neutral position upon release of force from said actuating means.

4. The invention according to claim 1 wherein said valve means comprises a first valve connected to said inlet and a second valve connected to said outlet.

* * * * *